United States Patent [19]

Nakai et al.

[11] Patent Number: 5,117,247

[45] Date of Patent: May 26, 1992

[54] VIEWFINDER OPTICAL SYSTEM COMPENSATED IN MACROPHOTOGRAPHIC OR PARALLOX DIOPTER

[75] Inventors: Etsuko Nakai; Hiromu Mukai, both of Osaka, Japan

[73] Assignee: Minolta Camera Kabushiki Kaisha, Osaka, Japan

[21] Appl. No.: 529,115

[22] Filed: May 24, 1990

[30] Foreign Application Priority Data

May 24, 1989 [JP] Japan ................................ 1-132117
Jun. 22, 1989 [JP] Japan ................................ 1-160299
Jun. 22, 1989 [JP] Japan ................................ 1-160300

[51] Int. Cl.⁵ .......................................... G03B 13/10
[52] U.S. Cl. .................................... 354/222; 354/164; 354/195.12; 359/705
[58] Field of Search .............. 354/221, 222, 223, 224, 354/225, 995.12, 219, 164; 350/428, 429, 430; 359/705

[56] References Cited

U.S. PATENT DOCUMENTS 4,287,564 9/1981 Swift et al. ....................... 355/86
4,940,030 7/1990 Haraguchi ....................... 354/222

FOREIGN PATENT DOCUMENTS 62-84336  12/1987 Japan .
63-52114   3/1988 Japan .
63-70539   5/1988 Japan .
63-179340  7/1988 Japan .
63-191326 12/1988 Japan .
63-191327 12/1988 Japan .
1-166024   6/1989 Japan .

Primary Examiner—W. B. Perkey
Assistant Examiner—Cassandra C. Spyrou
Attorney, Agent, or Firm—Price, Gess & Ubell

[57] ABSTRACT

A viewfinder optical system, separate from a photographing optical system, for picture taking. The viewfinder optical system includes an objective lens, an eyepiece, and a compensation lens. The compensation lens is capable of being positioned in an optical path of the viewfinder optical system at object distances closer than a predetermined distance for simultaneously compensating for any variance in parallax and diopter between the viewfinder optical system and the photographing optical system in the macro mode.

22 Claims, 12 Drawing Sheets

VIEWFINDER OPTICAL SYSTEM COMPENSATED IN MACROPHOTOGRAPHIC OR PARALLOX DIOPTER

BACKGROUND OF THE INVENTION

1. Field of the invention

The present invention generally relates to a camera having a photographing optical system and a view finder optical system separately and more particularly to a view finder comprising a means for compensating parallax and gap in diopter possibly occurring in the view finder optical system at the time of macro-photographing.

2. Description of the related art

Hitherto, cameras except those of the single-lens reflex type are generally constituted with an optical axis for the view finder optical system separate from that for the photographing optical system. Hence, the light directed to a camera from a given point on the optical axis for the photographing optical system forms an image on the optical axis for the photographing optical system, while in the view finder optical system the image is formed at a position off its optical axis. The extent of the gap between the position of image formation and the optical axis for the view finder optical system, namely the parallax, is almost small enough not to cause any problem when the aforementioned given point is extremely far from the image-forming plane but it increases progressively with decreasing distance therebetween and accordingly the gap between the center of the taking scope and the center of the view finder's field of view increases gradually but progressively. Especially, in case of macro-photographing, if the frame of the visual field to be used is the same as that at the time of normal photographing, the picture in the view finder is different from the picture actually taken.

An arrangement for solving such a problem is or known one in which, as shown in FIG. 1A and FIG. 1B, the view finder has marked therein a frame showing the field of vision, i.e. visual field frame 50A or 50B for macro-photographing in addition to the visual field frame 50 for normal photographing. Even in this case, it is extremely difficult to see the four corners of the visual field frame for macro-photographing, i.e. the precise taking scope. Also, if, for instance, the photographer has scarcely any interest in a camera, it is even possible that photographing is done without knowing that in macro-photographing the taking scope is to be matched with the visual field frame for macrophotographing.

As another arrangement for compensation of parallax, it is possible to add an optical element to the view finder optical system. As to such an arrangement, the techniques involved are disclosed in Japanese Laid-Open Patent Publication 62-284336, Laid-Open Patent Publication 62-52114, Laid-Open Utility Model Publication 63-70539 et cetera, but these are all based on the principle of disposing a prism on the object lens side of the view finder optical system and compensating the parallax by utilizing the refraction of light by this prism.

Meanwhile, since, in the case of a single-lens reflex camera, it is so arranged that the focused image condition is formed always on the image-forming plane regardless of the object distance, the object's image can be seen at the same position also in the view finder. Hence, since the distance between the photographer's eye and the image-forming position is kept constant, the diopter or the distance at which the object's image is visible to the photographer is always constant. In a camera with the photographing optical system and the view finder optical system provided separately as described above, it is a usual practice not to vary the view finder optical system according to the object distance, hence the image-forming position varies with the object distance. The diopter, too, varies accordingly, hence especially when the variation of diopter as in the case of macro-photographing, no focused image is visible in the view finder.

The term gap in diopters refers to the difference in image plane caused by the difference in object distance. Diopter is the distance at which the object image is visible to the photographer. Basically, a gap in diopters will be the displacement of the image of the object behind the desired predetermined plane in the view-finder optical system. As a result, a formed image can be blurred to the photographer, since the eyepiece is generally located at an appropriate position wherein the object image formed at the predetermined plane appears most clearly to the photographer. When an object is at an infinite distance, any gap in diopters or change in diopters will not present a problem. However, when a viewfinder optical system is utilized in macrophotography, both parallax and a gap in diopters can present problems.

Hence, in macro-photographing it is necessary to compensate the gap in diopter together with the parallax for the photographer to be able to see a proper image in the view finder. It is, however, not desirable to compensate them by different means for it inevitably results in complication of the compensating mechanism, which, in turn, results in enlargement of the view finder.

SUMMARY OF THE INVENTION

The present invention has been made for effectively solving such conventional problems. Hence it is aimed at providing compensation of both parallax and gap in diopters with a means of simple composition, namely one solving means and specifically one optical element.

A preferred embodiment of the present invention relates to a camera comprising a photographing optical system with selectable positions for normal photographing and macro-photographing and a view finder optical system having an objective lens and an eye piece and forming an image on a given image-forming plane and features being of the following composition.

That is, there is provided a correcting lens which, when the macro-photographing position is selected for the photographing optical system, is positioned either before or after the objective lens with the position for macro-photography selected, refracts the optical path of the object for compensation of the parallax with simultaneous compensation of the diopter for an image to be formed on the aforementioned focusing plane by simultaneous variation of the converging index of the luminous flux and driving means for shifting this correcting lens so as to advance to and retract from a given position on the optical axis of the view finder optical system according to the taking position of the photographing optical system.

In the aforementioned composition, when the normal photographing position is selected for the photographing optical system, the correcting lens is shifted by the driving means off the predetermined position on the optical axis of the view finder optical system either before or after the objective lens. Hence, in the visual field of the view finder the image is formed in the predetermined focusing plane.

When the macro-photographing position is selected for the photographing optical system, the correcting lens is shifted by the driving means to the predetermined position on the optical axis of the view finder optical system either before or after the objective lens. Then, the light from a given point on the optical axis of the photographic optical system toward the camera is refracted as it passes through this correcting lens with simultaneous variation of the convergency index, and parallax and gap in diopters are both compensated for an image to be formed on the aforementioned predetermined image-forming plane. Hence, with this view finder the proper taking scope under the condition for macro-photographing can be seen properly.

As mentioned above, the aforementioned composition allow simultaneous compensation of both parallax and gap in diopters by a single optical element, namely the correcting lens. Hence, the present invention is aimed at simplification of the composition of a view finder which enables clear view of a proper image corresponding to the taking scope as well as for miniaturization of the view finder.

Another preferred embodiment of the present invention relates to a camera comprising a photographing optical system with selectable positions for normal photographing and macro-photographing and a view finder optical system having an objective lens and an eye piece, and features being of the following composition.

That is, the aforementioned objective lens is composed of a first objective lens which is disposed in the view finder optical system, when the normal photographing position is selected for the photographing optical system, for an image to be formed on the predetermined image-forming plane and a second objective lens which, too, is disposed in the view finder optical system, when the macro-photographing position is selected for the photographing optical system, for compensating the parallax by refracting the optical path of the object with simultaneous compensation of the gap in diopter for an image to be formed on the aforementioned image-forming plane by proper variation of the convergency index of the luminous flux, and there is provided driving means for shifting one of the aforementioned objective lens to one of the alternative positions on the optical axis of the aforementioned view finder optical system according to the photographing position of the aforementioned photographing optical system.

In the aforementioned composition, when the normal photographing position is selected for the photographing optical system, the first objective lens is selected as the objective lens and is disposed at the predetermined position on the optical axis of the view finder optical system.

Meanwhile, when the macro-photographing position is selected for the photographing optical system, the second objective lens is selected and disposed at the predetermined position on the optical axis of the view finder optical system. The image is then formed at the predetermined image-forming position. Then, the light from a given point on the optical axis of the photographing optical system toward the camera is refracted as it is passes through this second objective lens and simultaneously its convergency index is varied, and the parallax as well as the gap in diopters is compensated.

Hence, in this case, too, proper photographing is feasible under the macro-photographing condition.

As mentioned above, aforementioned composition allow simultaneous compensation of both parallax and gap in diopters by a single optical element, namely the second objective lens. Hence, the present invention is aimed at simplification of the composition of a view finder which enables clear view of a proper image corresponding to the taking scope as well as for miniaturization of the view finder.

A still another preferred embodiment of the present invention is a camera comprising a photographing optical system with selectable positions for normal photographing and macro-photographing and a view finder optical system having an objective lens and an eye piece and is provided with lens driving mechanism for shifting the aforementioned objective lens to a first position on the optical axis of the view finder optical system to be formed on the predetermined image-forming plane when the normal photographing position is selected for the photographing optical system, and to a second position before the aforementioned first position along the optical axis of the object axis and on a line perpendicular thereto for compensation of the parallax by refraction of the luminous path of the object with simultaneous convergence of the aforementioned focusing plane, when the macro-photographing position is selected for the photographing optical system.

When, in the aforementioned composition, the normal photographing position is selected, the objective lens is shifted by the driving mechanism to the first position on the view finder optical axis. And the image is formed on the predetermined image-forming plane in the visual field of the view finder. Hence the photographer can clearly see the position in the view finder.

Meanwhile, when the macro-photographing position is selected for the photographing optical system, the objective lens is shifted by the driving mechanism in a direction perpendicular to the optical axis of the view finder optical axis and simultaneously forward along the optical axis of the view finder optical system to the second position. With this objective lens disposed at this second position the luminous flux from a given point on the optical system of the photographing optical system toward the camera, for instance, converges at a position nearer to the object than when the objective lens is at the first position and since its refracting direction is varied compared with the case where the objective lens is at the first position, it is possible to compensate the parallax and the gap in diopters for the luminous flux from the object to be converged at the center of the image-forming plane. Hence, with this view finder a proper taking scope under the condition of macro-photographing is clearly visible.

As mentioned above, the aforementioned composition enables simultaneous compensation of the parallax and the gap in diopters. Hence, since it is not necessary to provide these compensation means separately, it is possible to simplify the composition of the view finder enabling seeing clearly a proper image corresponding to the taking scope and miniaturize it.

Another, preferred embodiment of the present invention provides a position adjusting mechanism comprising a photographing optical system with selectable positions for normal photographing and macro-photographing, a view finder having an image erect optical system such as the porro prism and the so-called porro mirror having four reflective planes optically arranged with reflective mirrors and a position-adjusting mechanism for adjusting the position of each reflective plane for compensating the parallax by matching the center of the taking scope with that of the view finder's field of vision and also compensating the gap in diopter by converging the luminous flux on the aforementioned image-forming plane through variation of its optical path length, when the normal photographing position is selected for the photographing optical system.

In the aforementioned composition, when the normal photographing position is selected for the photographing optical system, each reflective plane in the view finder's optical system is positioned at the normal position corresponding to the normal photographing optical system by the position-adjusting mechanism. Accordingly, the image is formed on the image-forming plane, and the photographer can clearly see the image corresponding to the taking scope.

Meanwhile, when the macro-photographing position is selected for the photographing optical system, each reflective plane has its position varied by the position-adjusting mechanism. The reflective planes of the porro prism and the porro mirror have their positions variously arrangeable by means of the position-adjusting mechanism, and according to such an arrangement, answer is given to such important questions as which reflective plane should be shifted in which direction for compensation of the parallax. Now explanation will be made about, as an example, the case where the reflective plane positioned nearest to the object (This is called the first reflective plane and others are called the second, third and fourth reflective planes progressively nearer to the photographer.) is so disposed that the light incident upon the camera from the object is refracted downward, the second reflective plane is so disposed that the light from the first reflective plane is refracted toward the right as viewed from the photographer, the third reflective plane is so disposed that the light from the second reflective plane is refracted upward and the fourth reflective plane is so disposed that the light from the third reflective plane is refracted to be again along the direction from the object to the camera. Although the direction in which the reflective plane is shifted is to be varied also according to the positional relationship between the photographing optical system and the view finder optical system, explanation will be made, also as an example, about the case where the view finder optical system is located over the photographing optical system.

In this composition since if, for example, the fourth reflective plane is shifted downward, the light reflecting position on this reflective plane, too, is shifted downward and, accordingly, the position of the formed image of the object, too, is shifted downward. Since the parallax at the time of macro-photographing with the view finder optical system located over the photographing optical system is caused by image formation over the normal image-forming position, the parallax supposed to occur under that condition can be compensated by shifting the fourth reflective plane downward so that the image-forming position is lowered by the extent equivalent to the existing parallax.

Meanwhile, gap in diopters is caused by increase of the distance from the objective lens to the image-forming position as the object comes nearer to the camera and the resultant formation of the image of the object at a position off the proper image-forming plane. Hence, occurrence of the gap in diopters can be prevented by varying only the length of the optical path between the objective lens and the image forming plane by equivalent of the increased distance. In this connection, the distance between the third reflective plane and the fourth reflective plane, i.e. the length of the optical path, can be made smaller by shifting the fourth reflective plane as mentioned above. If, for instance, the second and the third reflective planes are simultaneously shifted downward, however, the distance between the objective lens and the image-forming plane only can be increased without varying the image-forming position. Hence, it is possible to vary the shortened length of the optical path to a proper length for compensation of the gap in diopter by shifting the aforementioned fourth reflective plane.

As mentioned above, according to the aforementioned composition, it is possible to compensate the parallax and the gap in diopters by shifting each reflective plane. Hence, it is then not necessary to provide separate compensation means for the parallax and the gap in diopters, hence it is possible to provide a view finder enabling to see clearly a proper image equivalent to the taking scope without enlarging it, i.e. having its size as small as that of a view finder provided with either of these compensating means.

BRIEF DESCRIPTION OF THE DRAWINGS

These and other objects and features for the present invention will become apparent from the following description taken in conjunction with the preferred embodiment thereof with reference to the accompanying drawings, in FIGS. 1A and 1B are sketches showing the visual field frames marked in a conventional view finder as previously described.

DETAILED DESCRIPTION OF THE INVENTION

Figure 1A:
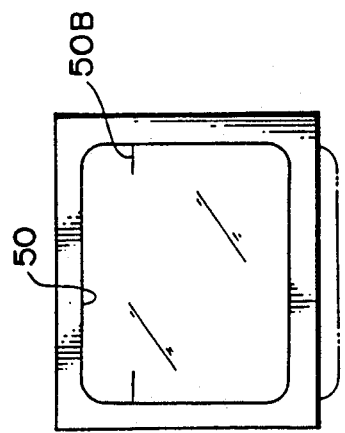

Before the description of the present invention proceeds, it is to be noted that like parts are designated by like reference numerals throughout the accompanying drawings.

Embodiments of the present invention shown in the accompanying drawings, FIGS. 2 through 24, will hereinafter be described in detail.

First Embodiment

First to be described is the first embodiment of the present invention shown in FIGS. 2 through 10.

Figure 2:
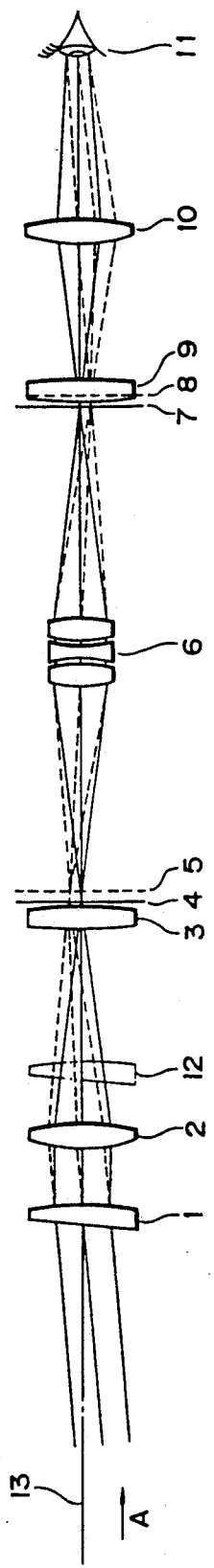
FIG. 2 is a schematic view showing the outline composition and the optical path of a view finder according to the first embodiment of the present invention.

Referring first to FIG. 2, the view finder's optical path will be explained. The figure shows the optical path of the view finder optical system when it is located over the photographing optical system. As shown in the figure, this optical system comprises a correcting lens 1, objective lens 2, first condenser lens 3, relay lens 6, second condenser lens 9 and eye piece 10. Reference numerals 4 and 7 designate image-forming planes, one of which has marked therein a visual field frame (not shown). When macro-photographing is done with a camera in which the view finder optical system is provided separate from the photographing optical system, the luminous flux along the direction A from the center of the taking scope toward the camera is incident upon the view finder optical system at a given angle to its optical axis 13. When the correcting lens 1 is not provided, the incident light advances along the broken line and first focuses to form an inverted image at a position 5 and then forms an erect image at a position 8 after passing through the relay lens 6. In this case, because of the proximity of the object compared with the case of normal photographing in addition to occurrence of parallax corresponding to the incident angle, images are formed off the image-forming planes 4 and 7 proper for seeing the image formed clearly toward the photographer's eye 11 respectively, this resulting in a gap in diopters. In contrast thereto, when the correcting lens 1 wedge-formed with one side thereof finished spherically is positioned as a positive lens in front of the objective lens 2 as shown in the figure, the light is converged being refracted by this correcting lens 1 and images are formed on the proper image-forming planes 4 and 7 with the center of the view finder's field of vision agreed with that of the taking scope. This means that both parallax and gap in diopter are compensated simultaneously by a single lens.

It is also possible to position the correcting lens 1 behind the objective lens 2 as shown by the imaginary line as 12. It is thereby possible to further miniaturize the view finder despite addition of the correcting lens without changing the overall length of the optical system. Also, although in this embodiment reversal of the image in the vertical and the lateral direction is done by means of the relay lens 6, the porro prism and the so-called porro mirror formed through combination of plural mirrors may possibly be used instead.

Figure 1B:
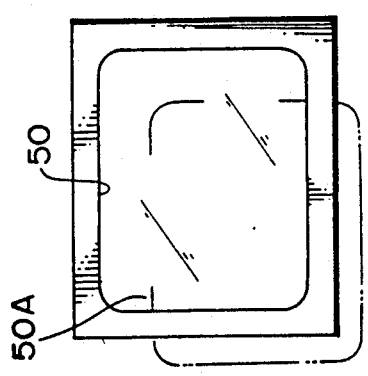
Figure 4A:
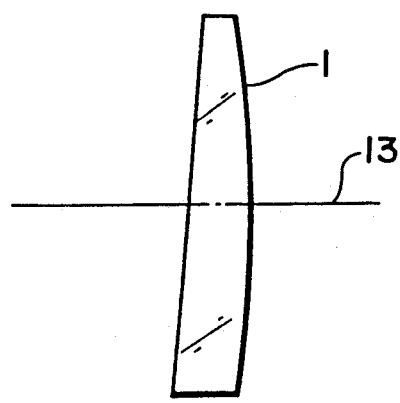
FIGS. 4A through 4E are outline views showing variations of correcting lenses comprising the view finder according to the first embodiment.
Figure 4B:
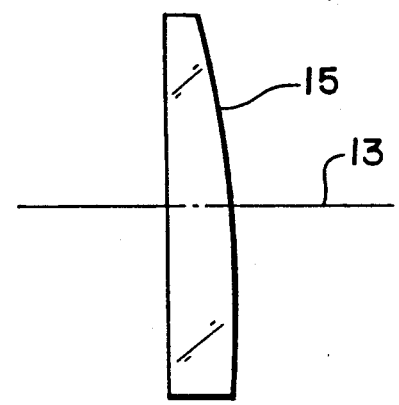
Figure 4C:
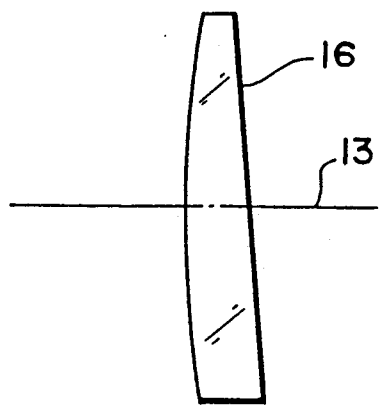
Figure 4D:
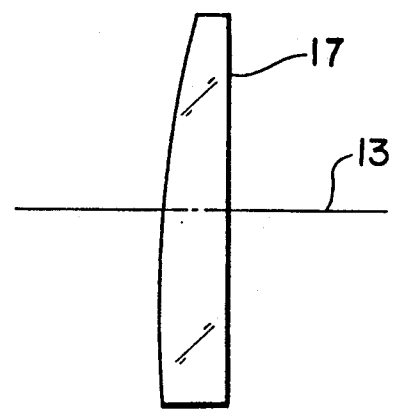
Figure 4E:
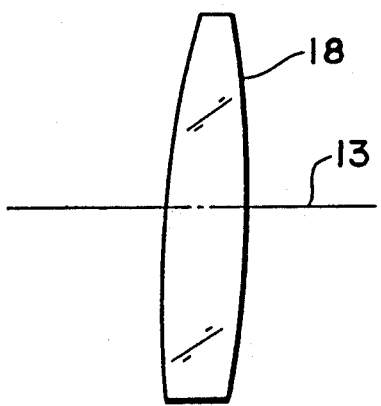

Further, the peripheral form of the correcting lens is not limited to that shown in FIG. 1 and various alternative forms are conceivable as shown in FIGS. 4A through 4E. Shown in FIG. 4A is the correcting lens 1 in FIG. 2 with its front face flat and inclined to a plane perpendicular to the optical axis 13 and its back face formed spherical with its center (of sphere) on the optical axis. Shown in FIG. 4B is a correcting lens 15 with its front face flat and perpendicular to the optical axis 13 and its back face spherical with its center off and below the optical axis 13. Shown in FIG. 4C is a correcting lens 16 with its front face spherical with its center on the optical axis 13 and its back face flat and slightly inclined with respect to a plane perpendicular to the optical axis 13. Shown in FIG. 4D is a correcting lens 17 with its front face spherical and its center off and below the optical axis 13 and with its back face flat and perpendicular to the optical axis 13. And shown in FIG. 4E is a correcting lens 18 with its front face sperical with its center off and below the optical axis 13 and its back face sperical with its center on the optical axis 13. Since these are all wedge-formed positive lenses, the degrees of convergence and refraction of light can be varied simultaneously by arranging some thereof before and/or after the objective lens 2. Hence, parallax as well as gap in diopters can be well compensated by the use of a properly wedge-formed correcting lens.

Figure 5:
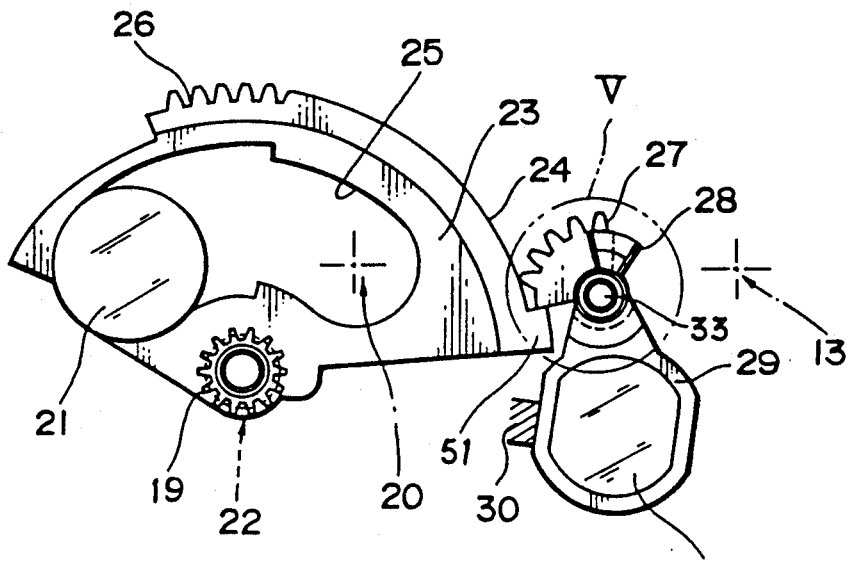
FIG. 5 is a front view showing the driving mechanism for the correcting lenses in normal photographing.
Figure 6:
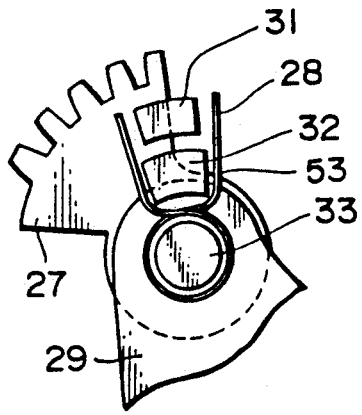
FIG. 6 is an enlarged view of the encircled part V in FIG. 5.
Figure 7:
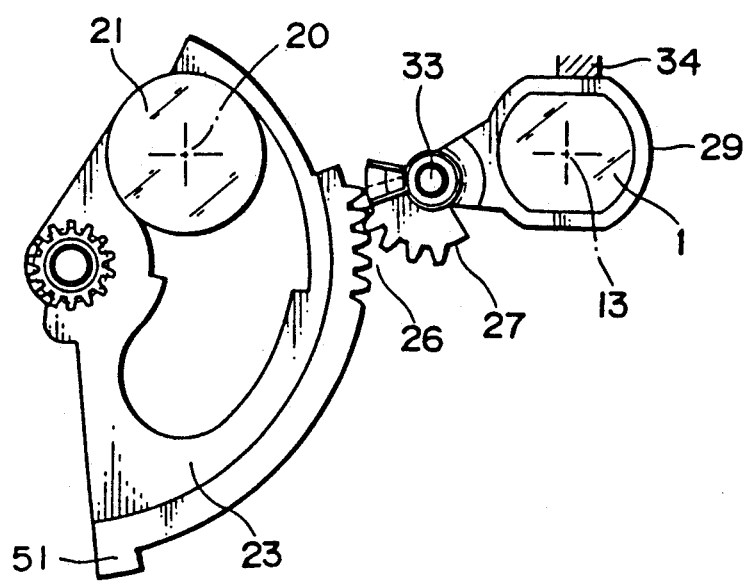
FIG. 7 is a front view showing the driving mechanism for the correcting lenses in macro-photographing.

Then, referring to FIGS. 5 through 7, explanation will be made about the driving mechanism for the compensation lens. In FIG. 5 reference numeral 21 designates a close-up lens included in a photographing optical system, and macro-photographing becomes feasible when this lens 21 has its center on an optical axis 20. Shown in the figure is the arrangement for normal photographing with the lens 21 off the optical axis 20. The close-up lens 21 is fixedly retained by a fan-shaped first retaining member 23, which is made to rotate via a gear 19 as a motor 22 is driven. This first retaining member 23 has an opening 25 formed therein so that the part in front of the objective lens is always kept open, and the outer peripheral arc 24 has a gear section 26 at one end thereof and a stopper 51 at the other end. Meanwhile, the correcting lens 1 is set in a second retaining member 29 swingably with a pin 33 as fulcrum. Further, the pin 33 has set thereon and rotatable thereabout a correcting lens driving gear 27 for engaging with the gear section 26 of the first retaining member. This second retaining member 29 and the lens driving gear 27 have projections 32 and 31 respectively as shown in detail in FIG. 6, and the pin 33 has fixed thereto a U-sectioned spring with two shanks 53 sandwitching the aforementioned projections 32 and 31 therebetween.

In the aforementioned composition shifting from the normal-photographing setup to the macro-photographing setup is done by driving the motor 22 for rotating clockwise the first retaining member 23 from the position shown in FIG. 5. As the first retaining member 23 rotates, its gear section 26 comes in time into engagement with the correcting lens driving gear 27, which is then caused to rotate counterclockwise about the pin 33. Hence, the projection 31 formed thereon causes the spring 28 to rotate about the pin 33 in the same direction. Since the projection 32 is pushed as the spring 28 rotates, the correcting lens 1 shifts toward the optical axis 13 of the view finder. The correcting lens 1 is positioned on its optical axis 13 as the second retaining member 29 comes into contact with the stopper 34 (FIG. 7), while the close up lens 21 is accurately positioned on the optical axis 20 of the photographing optical system with the first retaining member 23 rotated a little further. Hence the spring 28 becomes to have its shanks 53 somewhat pushed outward to give rise to an urging force and the correcting lens 1 is kept accurately positioned by this urging force, as seen from FIG. 7.

Meanwhile, shifting from the macro-photographing setup to the normal photographing setup is done by reversing the motor. Then, since the first retaining member 23 rotates counterclockwise and the correcting lens driving gear 27 is thereby caused to rotate clockwise, the spring 28 having had its shanks 53 pushed outward is restored to free, unrestrained condition. As the projection 31 further rotates in the same direction about the pin 33, the second retaining member 29 is caused to rotate clockwise via the spring 28 and the projection 32 and the correcting lens 1 is shifted off its position on the optical axis. When the rotating first retaining member 23 has reached the position for normal photographing, the correcting lens driving gear 27 is pressed against the stopper 51 and the second retaining member 29 is thereby caused to be pressed securely against the stopper 30 via the spring 28. Hence, there is no risk of the correcting lens 1 accidentally moving to be on the optical axis 13.

Figure 8:
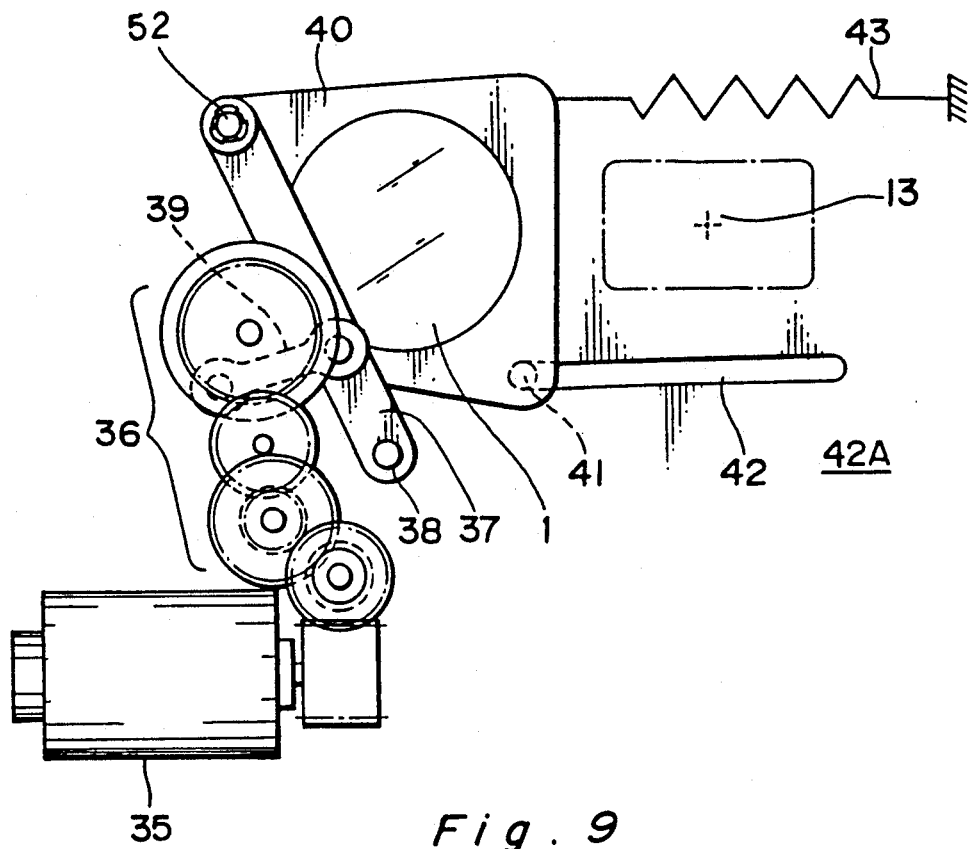
FIGS. 8 and 9 are front views showing the correcting lens driving mechanism as a variation of the one shown in FIG. 5 in normal photographing and macro-photographing respectively.
Figure 9:
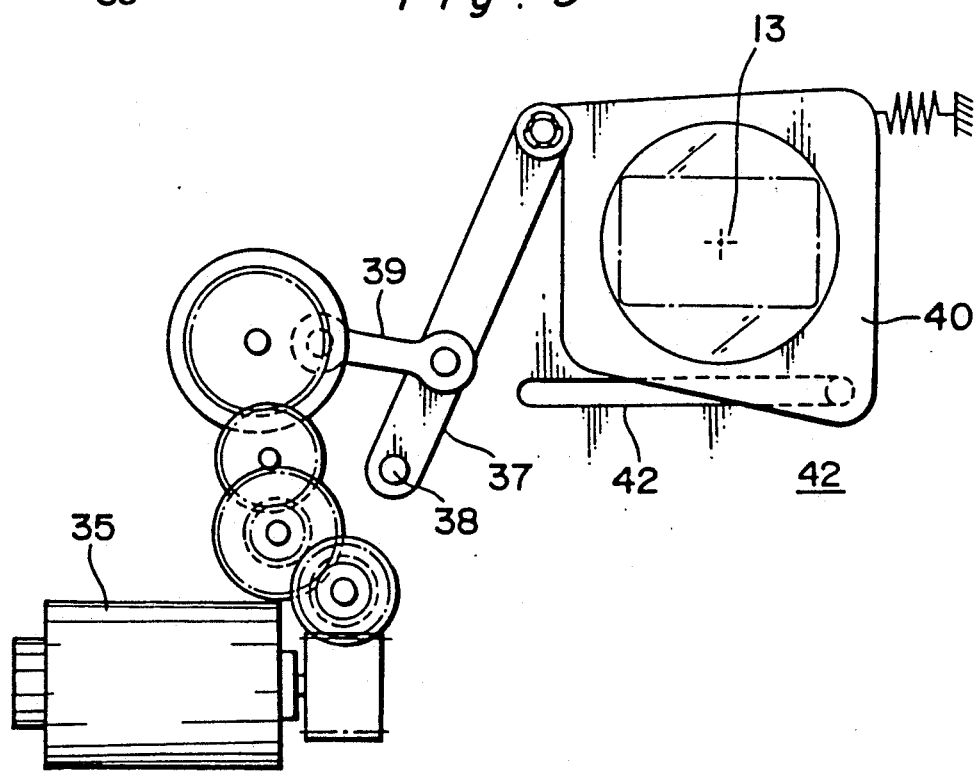
Figure 10:
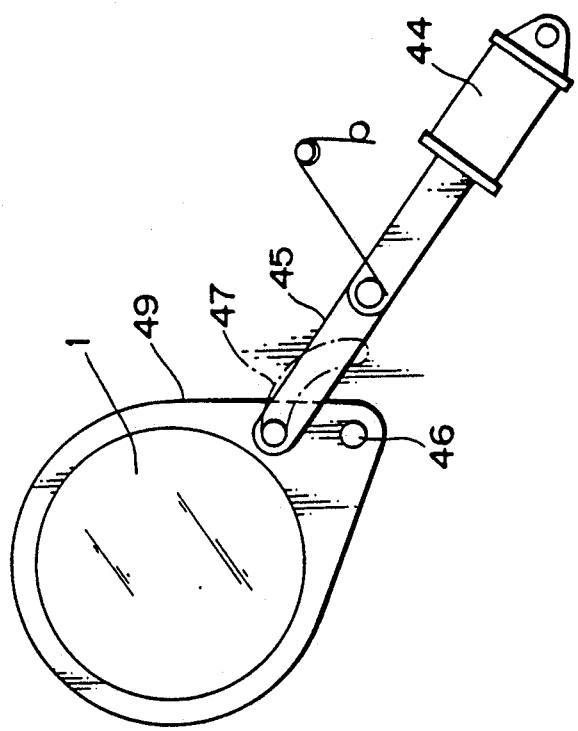
FIG. 10, too, is a front view showing the correcting lens driving mechanism of still another variation.

As to this driving mechanism, a possible modification is shown in FIGS. 8 and 9. In these figures the correcting lens 1 is retained by a roughly rectangular retaining member 40 having pins 41 and 52 at diagonal positions. The pin 41 is arranged to be slidable in a guiding groove 42 provided in the camera's body member 42A, while the pin 52 is engaged with one end of a lever 37 for the latter to be swingable and this lever 37, in turn, is engaged near its center with one end of a swingable arm 39. The other end of the lever 37 is engaged with a pin 38 provided on the camera body, while the other end of the arm 39 is connected with the final gear of the gear train 36, which, in turn, is connected to the motor 35.

With the driving mechanism having this composition, when the lever 37 is rotated clockwise around the pin 38 by driving the motor 35, the retaining member 40 is moved rightward by means of the engagement of the guiding groove 42 and the pin 41. When the pin 41 has moved to the right end of the groove 41, it is so arranged that the correcting lens 1 is positioned on the optical axis 13. Shifting the correcting lens 1 off the optical axis 13 is done by reversing the motor 35, i.e. in a way opposite that described above. The spring 43 connected to the retaining member 40 is for preventing jolting of the correcting lens.

Further, although in these figures, the motor 35 is arranged for shifting the correcting lens 1 alone, it is needless to say that the same can also be used for shifting the close-up lens of the photographing optical system if two gear trains 36 are provided.

As another modification of the driving mechanism, there is one utilizing a cylinder 44 as shown in FIG. 9. As seen from the figure, which shows only the essential parts, it is possible by driving the cylinder 44 to shift the lever 45 along the guiding groove 47 and thereby cause the correcting lens 1 retained in the retaining member 49 to swing about the pin 46. Hence, like in any of the compositions described above, it is possible to shift the correcting lens 1 toward or away from the optical axis 13.

By the use of the correcting lens 1 and choice of a proper one of the compositions of its driving mechanism described above it is possible to keep the image-forming position in the view finder substantially unaltered when the normal photographing position or the macro-photographing position is selected for the photographing optical system and thereby preclude any problematic parallax or gap in diopter. Moreover, since these compensations are feasible with a single lens, there is no possibility of the view finder as such becoming bulky compared with one provided with the compensating mechanism for, for example, parallax only.

Figure 3:
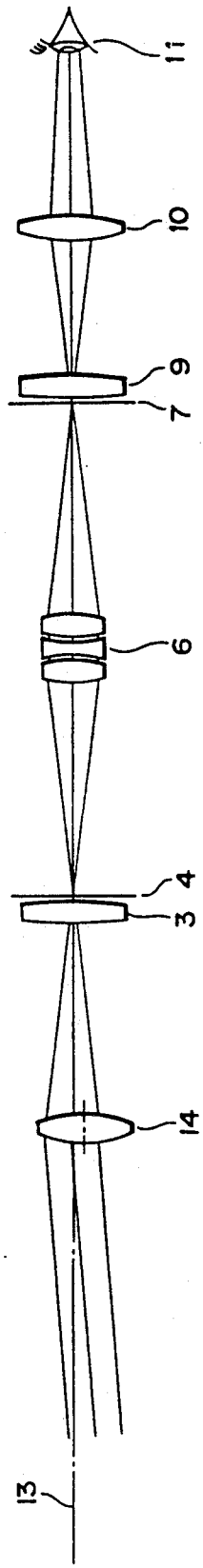
FIG. 3, too, is a schematic view showing the outline composition and the optical path of another view finder according to a variation of the first embodiment.

Then, explanation will be made about a variation of the first embodiment with reference being made to FIG. 3. As seen from the figure, no correcting lens is used here and compensation of the optical path is done by means of an objective lens 14. Hence, in this variation different objective lenses are used depending on whether the normal photographing position or the macro-photographing position is selected for the photographing optical system. Specifically, the second objective lens to be used when the macro-photographing position is selected for the photographing optical system has a focal distance shorter than that of the first objective lens which is used when the normal photographing position is selected. And in macro-photographing the second objective lens 14 is positioned to be off the optical axis 13. This is because, when the second objective lens 14 is so disposed, the refracting direction of light is different from the case where both optical axes agree and through utilization of this property it is possible to change the direction of light incident at a given angle to the optical axis 13 to be positioned along the optical axis 13 and thereby compensate the parallax. This as well as the fact that this second objective lens 14 is shorter in focal distance than the first objective lens for the normal photographing and, therefore, the object's image can be formed on the predetermined image-forming plane enables clearly seeing a proper taking scope. This second objective lens 14 may possibly be a wedge-formed one and various variations thereof as explained in the first embodiment are also usable. Conversely, it is needless to say that it is also possible to use an ordinary convex lens as the correcting lens in the first embodiment disposed eccentric against the optical axis.

Although no illustration is made, in particular, about the driving mechanism for this composition, it may easily be realized through modification of the second retaining member 29 in FIG. 5. That is, having another lens retained on the optical axis 13 by the second retaining member 29 as illustrated in FIG. 5 and having the second retaining member 29 L-shaped so that the aforementioned additional lens can be retained thereby. It is also possible to have the objective lens in the view finder optical system automatically exchangeable according to the condition of the photographing optical system, if as the lens shown in FIG. 2 one for macrophotographing with a short focal distance (which, however, has to be so positioned to be eccentric against the optical path of the view finder optical system) is used and the additional lens is used for the normal photographing.

In the composition shown in FIG. 8 it is possible to accomplish the same function through modification of the retaining member 40 so that it can retain two lenses.

Such arrangements enable preclusion of any sizable parallax or gap in diopters as in the case of the first embodiment and miniaturization of the view finder by equivalent of omission of the correcting lens before the objective lens.

Second Embodiment

The second embodiment of the present invention will be described in detail below with reference to FIGS. 11 through 15.

Figure 11:
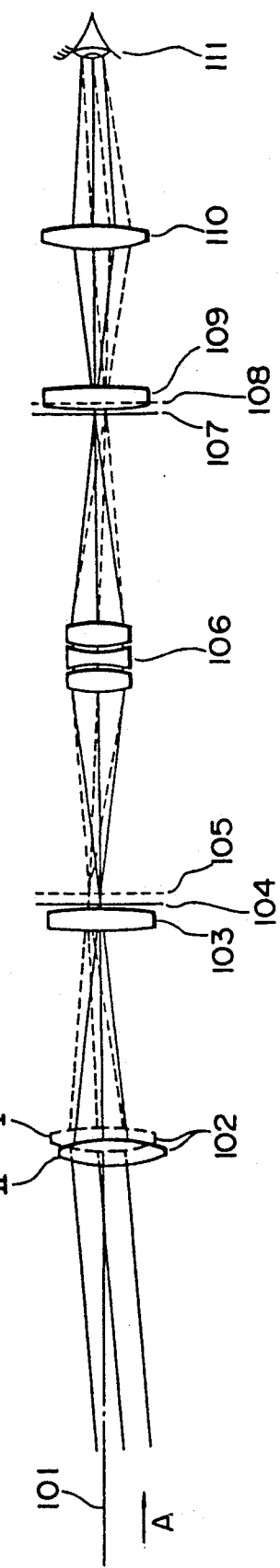
FIG. 11 is another sketch showing the outline composition and optical pin of a view finder according to second embodiment of the present invention.

Referring first to FIG. 11, explanation will be made about the view finder's optical path of this embodiment. The figure shows the optical path of the view finder optical system disposed over the photographing optical system. As seen from the figure, this optical system comprises an objective lens 102, first condenser lens 103, relay lens 106, second condenser lens 109 and eye piece 110. Reference numerals 104 and 107 designate each one image-forming plane and either thereof has marked therein a visual field frame (not shown). When macro-photographing is done with a camera in which the view finder optical system is provided separate from the photographing optical system, the luminous flux along the direction A from the center of the taking scope toward the camera is incident upon the view finder optical system at a given angle to its optical axis 101. When the objective lens 102 is disposed at the same position as at the time of normal photographing, that is, at the first position I, the incident light advances as indicated by the broken line and focuses to form an inverted image at the position 105 and an erect image at the position 108 after having passed the relay lens 106. In this case, since because of the proximity of the object compared with the case of normal photographing in addition to occurrence of parallax corresponding to the incident angle, the image is formed off the image-forming planes 104 and 107 proper for seeing the image formed clearly toward the photographer's eye 111 and, therefore, gap in diopters occurs in addition to the parallax corresponding to the incident angle.

In contrast thereto, it is possible to have the aforementioned luminous flux to converge at one point on the optical axis 101 for the object's image to be formed on the image-forming plane 104 by disposing the objective lens 102 at a position nearer to the object and toward the optical axis of the photographing optical system (a position diagonally below the first position I in this embodiment), namely at a second position II. This is because, since the focal distance of the objective lens 102 itself is constant, the gap in diopters can be compensated by shifting the objective lens 102 toward the object by equivalent of the gap in diopters and because of the characteristic that, when the objective lens 102 is disposed where it is eccentric against the optical axis 101, the refracting direction of the light having passed through the objective lens 102 is different from that when both optical axes are caused to agree. It is, therefore, possible to have the object's image formed on the original image-forming planes 104 and 107 with the center of the view finder's field of vision agreed with that of the taking scope. Thus, it is possible to compensate the parallax and the gap in diopters at the time of macro-photographing simultaneously by shifting the objective lens 102 to a proper position.

Although in this embodiment inversion of the image in the vertical and the lateral direction is done by means of the relay lens 106, it is needless to say that utilization of the porro prism or so-called porro mirror formed through combination of plural reflex mirrors is as well possible.

Then, referring to FIGS. 12-15, the driving mechanism for the objective lens 102 will be described.

Figure 12:
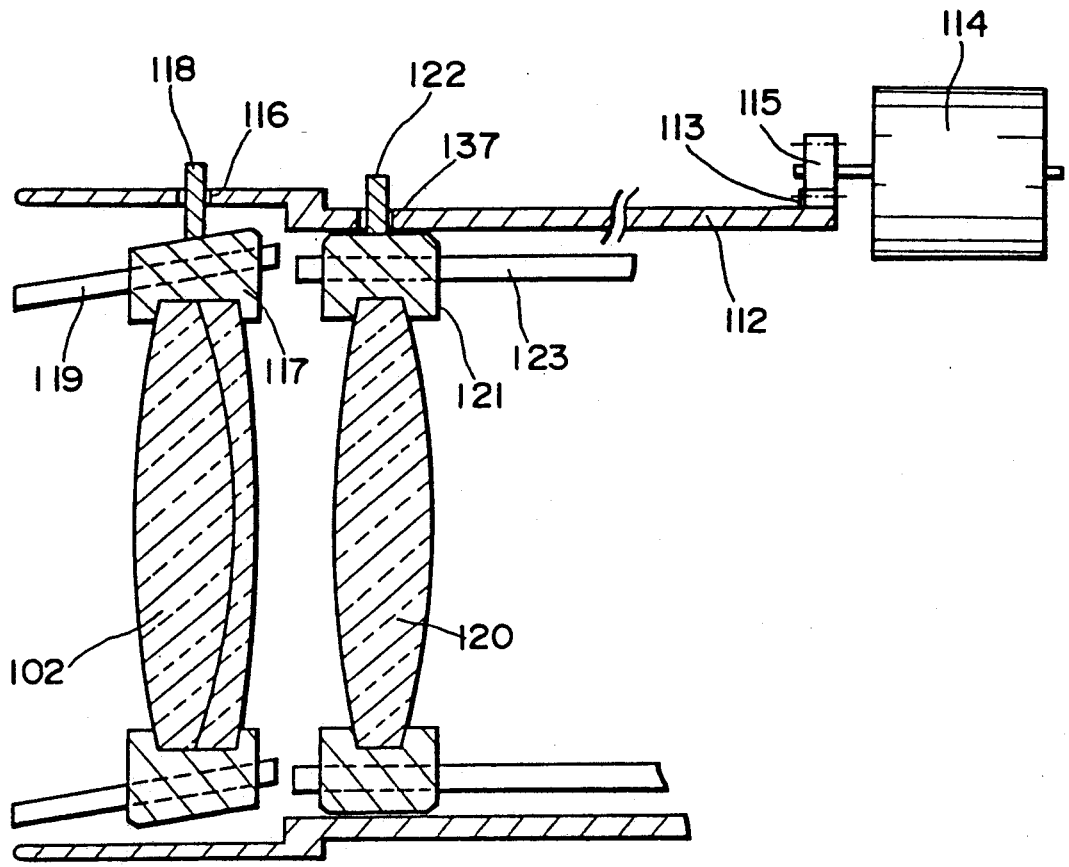
FIGS. 12 and 13 are, respectively, the sectional view and the perspective view showing the essential parts of the driving mechanism for an objective lens, according to the second embodiment.
Figure 13:
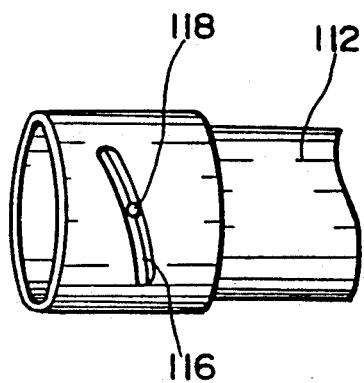

FIG. 12 is a sectional view of the essential parts showing the driving mechanism for the objective lens 102, and FIG. 13 is a perspective view thereof. In the figures reference numeral 112 designates the cam cylinder (barrel) retaining the lenses constituting the view finder optical system. In the periphery of the rear end portion of this cam cylinder 112 there is formed a gear section 113, which is meshed with a gear 115 connected to a motor 114.

Meanwhile, in the forward end portion of the cam cylinder 112 there is provided a spiral cam groove 116. This cam groove 116 is engaged with a pin-like first cam follower 118 provided in an objective lens frame 117 retaining the objective lens 102, and the objective lens frame 117 is also slidably engaged in the cam cylinder 112 with a diagonally progressive guide rod 119 fixedly secured to the camera body. If it is necessary for converging the luminous flux on the predetermined image-forming plane 104, a positive lens 120 may be disposed behind the objective lens 102 and this lens 120 may be made displaceable toward the optical axis, as shown in the figure. The mechanism illustrated comprises a spiral cam groove 137 provided behind the cam groove 116 in the cam cylinder 112, this cam groove 137 being engaged with a pin-like second cam follower 122 provided in a lens retaining frame 121 retaining the lens 120 and the lens retaining frame 121 is also engaged slidably with a straight-progressive guide rod 123 fixedly secured to the camera body behind the diagonally progressive guide rod 119.

When the driving mechanism for the objective lens 102 is constituted as described above and shifting is done from the normal photographing position to the macro-photographing position, the cam cylinder 112 is driven to rotate by the motor 114 and by the combined action of the cam groove 116, the cam follower 118 and the diagonally progressive guide rod 119, the objective lens 102 is shifted from the illustrated position forward along the optical axis and downward with respect to the optical axis. Then, the normal lens 120, too, is shifted along the optical axis and an accurate image of the object having its center well agreeing with that of the taking scope is formed thereby. Hence, according to this composition, it is possible to provide a view finder capable of compensating both parallax and gap in diopters at the time of macro-photographing with its size being comparable with that provided with a compensation means for gap in diopters or parallax only.

Figure 14:
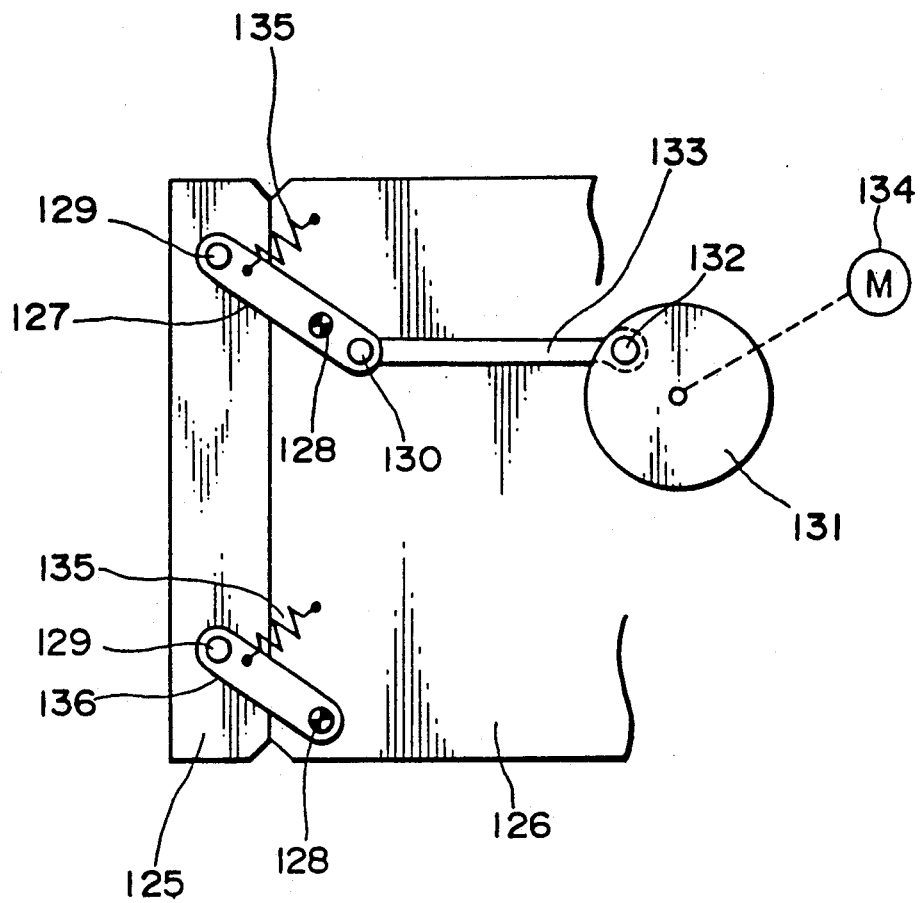
FIG. 14 is an enlarged side view of the driving mechanism in a variation of the second embodiment shown in FIGS. 12 and 13.
Figure 15:
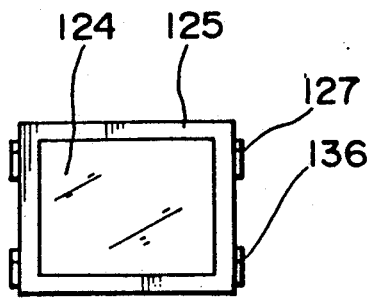
FIG. 15 is a front view thereof.

The driving mechanism for the objective lens may as well be of the composition shown in FIGS. 14 and 15. FIG. 14 is an enlarged side view showing a driving mechanism according to one variation of the second embodiment, and FIG. 15 is the front view of a view finder provided with such driving mechanism. As shown in FIG. 15, an objective lens 124 is oblong, hence it is retained in an oblong objective lens retaining frame 125. This oblong lens retaining frame 125 is mounted in a lens barrel 126 via link levers 127 and 136. More particularly, the link lever 127 is pivoted near its middle point by a pin 128 provided in the lens barrel 126 to be pivotable thereabout and has one end thereof supported by another pin 129 provided on the retaining frame 125 and set therethrough. With the link lever 136, the pins 128 and 129 are set through the mating holes at the ends thereof. Meanwhile, a rotatable disc 131 is set in the camera body and a pin 132 provided near its periphery is connected with a pin 130 set through the other end of the aforementioned link lever 127 by means of a connecting lever 133. The disc 131 is connected with a motor 134 for driving it. It is also so arranged that the objective lens 124 is kept urged toward the lens barrel 126 by a spring 135 connected with the link lever 127 when transmission of the torque of the motor 134 is cut off so that the first position I for the normal photographing is maintained without fail.

In this composition, when the motor is driven and its torque is transmitted to the disc 131, the objective lens 124 is shifted with the retaining frame 125 diagonally downward toward the object. This results in shifting to the second position II shown by the solid line in FIG. 11, hence simultaneous compensation of both parallax and gap in diopters is feasible. That is, in this composition, too, it is possible to simultaneously compensate both parallax and gap in diopters at the time of macrophotographing with the size of view finder being comparable with that provided with a compensating means for parallax or gap in diopter only.

Third Embodiment

The third embodiment of the present invention will be described in detail below with reference to FIGS. 16 through 24.

Figure 16:
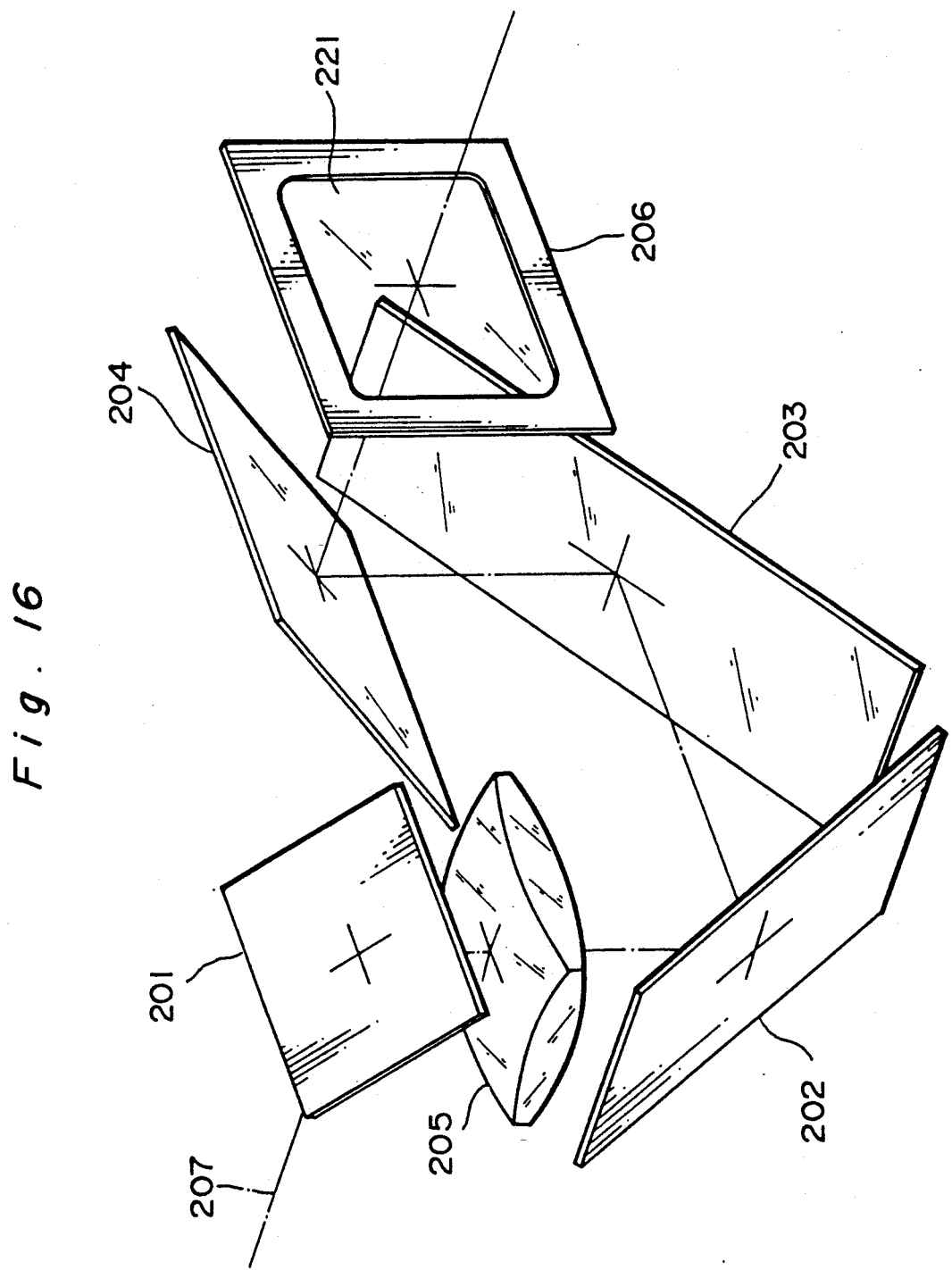
FIG. 16 is a sketch showing the outline composition and the optical path of the view finder according to the third embodiment of the invention.

Referring first to FIG. 16, the outline composition of a view finder optical system according to this embodiment will be explained. In this optical system, as seen from the figure, a first reflective plane 201 constituting a porro mirror at a position on the object side of an object lens 205 is displaced nearer to the photographer than the object lens 205, and a second, third and fourth reflective planes 202, 203 and 204 are so arranged that the normal line to each reflective plane is at an angle of 45° against the optical axis. At a position still nearer to the photographer than the fourth reflective plane 204 there is disposed a visual field frame 206 having an image-forming plane 221. There are also arranged an object window nearer to the object than the first reflective plane 201 and an eye piece nearer to the photographer than the visual field frame 206 (not shown).

When, in this composition, the normal photographing position has been selected for the photographing optical system, the light from one point on the photographing optical axis is incident substantially along the optical axis 207 of the view finder optical system, then it is refracted by each reflective plane to be along the optical axis and finally an image is formed about the center of the image-forming plane 221. Hence, in this case, the center of the taking scope and that of the view finder's field of vision agree approximately.

Figure 17:
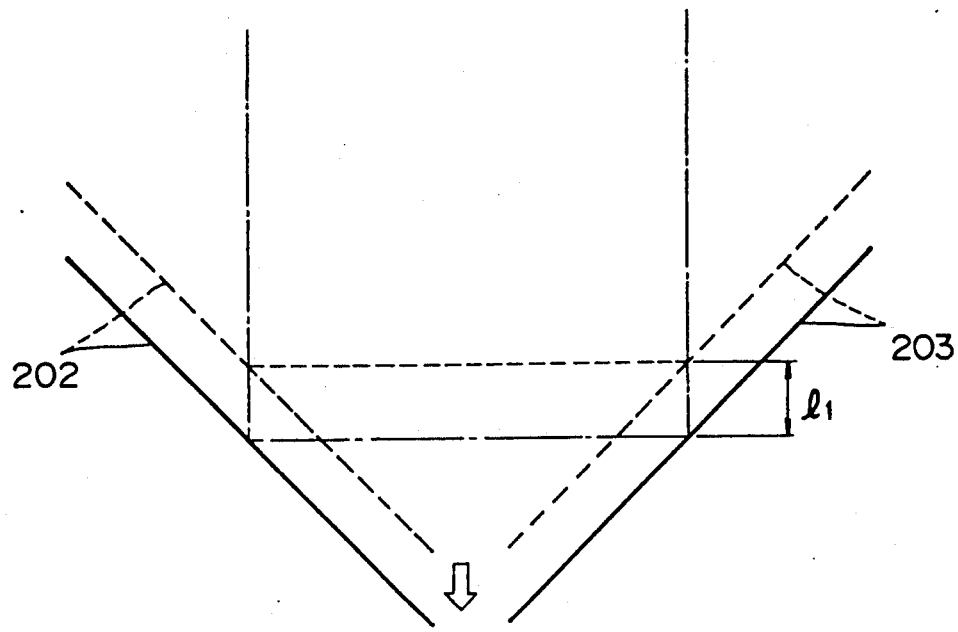
FIGS. 17 and 18 are illustratory views showing the path relative to the second and third reflective planes of the third embodiment of the invention as seen from the photographer's side.
Figure 18:
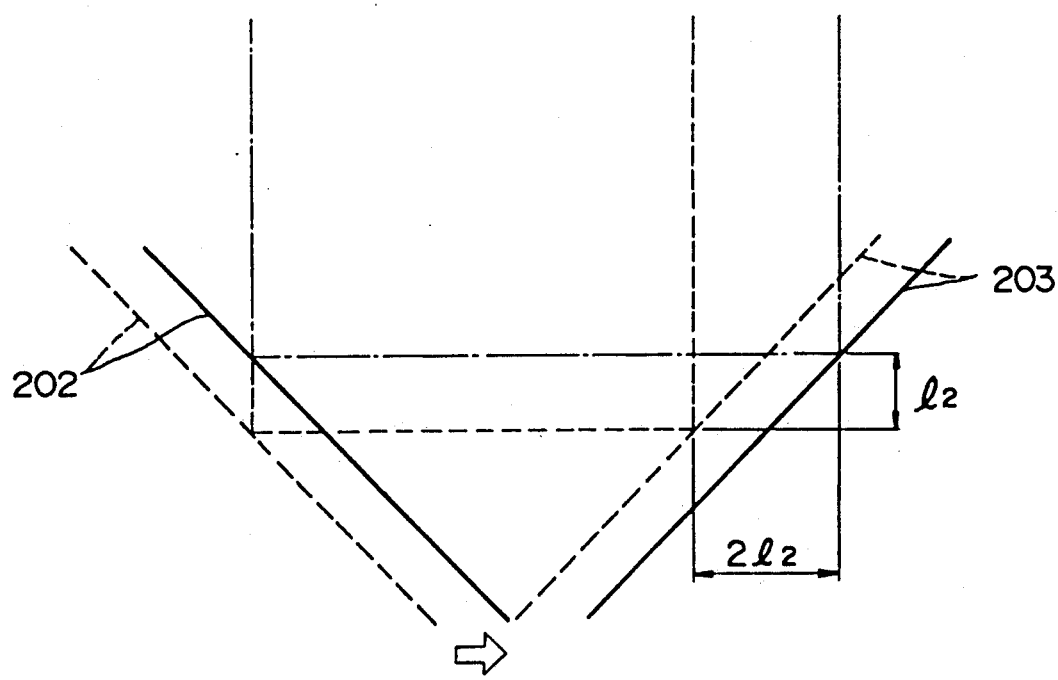
Figure 19:
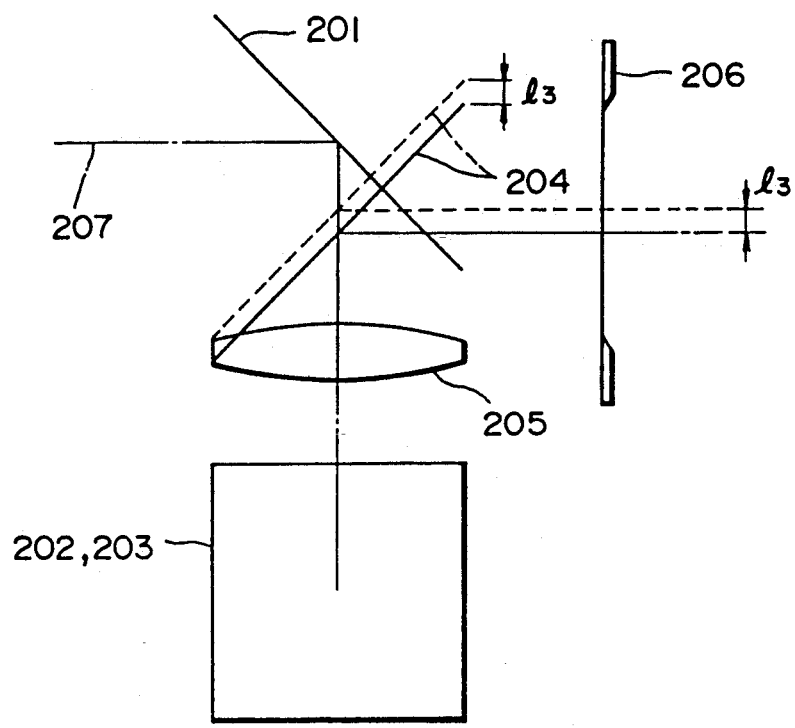
FIGS. 19 and 20 are the illustrative views showing the optical path relative to the view finder optical system of the third embodiment of the invention viewed from the side in the direction perpendicular to the optical axis.
Figure 20:
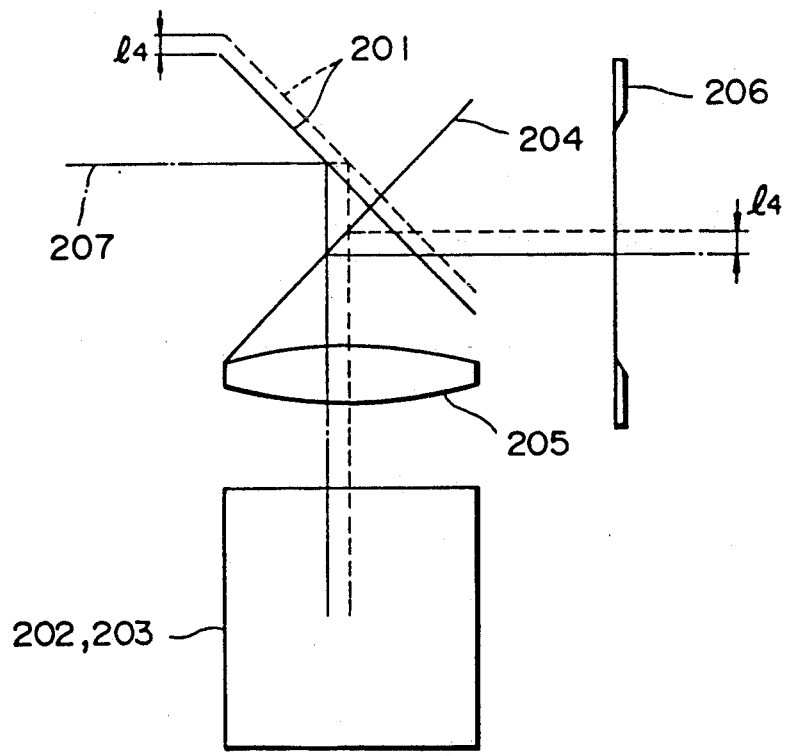

Then, referring to FIGS. 17-20, variation of the optical path as the individual reflective planes 201, 202, 203 and 204 are shifted in various directions will be explained. FIGS. 17 and 18 are illustratory views showing the optical paths as the second and third reflective planes are viewed from the photographer's side, and FIGS. 19 and 20 are further illustratory views showing the optical paths as the view finder optical axis is viewed from a side at the right angle against the optical axis. In these figures each reflective plane before moving is represented by the thick broken line and that after moving by the thick solid line, the optical path before moving is shown by the thin broken line and that after moving by the alternate long and short dash line.

FIG. 17 shows the condition in which the second and third reflective planes 202 and 203 have been shifted downward simultaneously. As seen clearly from the figure, the entire length of the optical path increases by $2l_1$ when both reflective planes 202 and 203 are shifted downward by the extent represented by $l_1$. Hence, if the position of the object remains unaltered, the image-forming position is displaced to a position before the original image-forming plane 221 by the extent equivalent to $2l_1$.

FIG. 18 shows the condition in which the second and third reflective planes 202 and 203 have been shifted rightward as viewed from the photographer's side by the extent represented by $l_2$. As seen from the figure, the optical path length before incidence upon the second reflective plane 202 and that after incidence upon the third reflective plane 203 decrease by $l_2$ respectively. Since, meanwhile, the optical path length between the second reflective plane 202 and the third reflective plane 203 is increased by $2l_2$, the increase and decrease in length are offset and the total optical length remains unaltered. Hence, the image is formed on the predetermined image-forming plane 221 but, as seen from the figure, the image-forming position is off that in the normal photographing by $2l_2$ sideways.

FIG. 19 shows the condition in which the fourth reflective plane 204 has been shifted downward by the extent represented by $l_3$. As seen from the figure, since the reflected light from the fourth reflective plane 204 is displaced downward by $l_3$ compared with that before downward shifting of the reflective plane 204, the image-forming position, too, is displaced on the image-forming plane 221 by $l_3$. Since in this case the distance between the third reflective plane 203 and the fourth reflective plane 204 decreases, however, the optical path from the objective lens 205 to the image-forming plane 221, too, is shortened by $l_3$. Hence, if the distance between the object and the objective lens 205 remains the same as that in the normal photographing, the image-forming position is displaced to a position behind the image-forming plane 221 by $l_3$.

FIG. 20 shows the condition in which the first reflective plane 201 has been shifted downward by the extent represented by $l_4$. As seen from the figure, the position on the first reflective plane 201 where light is reflected thereby is displaced forward compared with that before downward shifting thereof. And when the reflected light, which is re-reflected by the second and third reflective planes 202 and 203, is finally reflected by the fourth reflective plane 204, the reflecting position is displaced downward by $l_4$ from that before downward shifting of the first reflective plane 201. This means that the image-forming position is displaced downward on the image-forming plane 221 by $l_4$ as in the case of downward shifting of the fourth reflective plane 204 described above. Since in this case the length of the optical path between the objective lens 205 and the image-forming plane 221 remains unaltered before and after shifting of the reflective plane 201, the object's image is formed on the image-forming plane 21.

Thus, by adjusting the positions of the individual reflective planes it is possible to displace the image-forming position on the image-forming plane 221, longitudinally forward or rearward with respect thereto or in any direction attainable through combination thereof.

Figure 21:
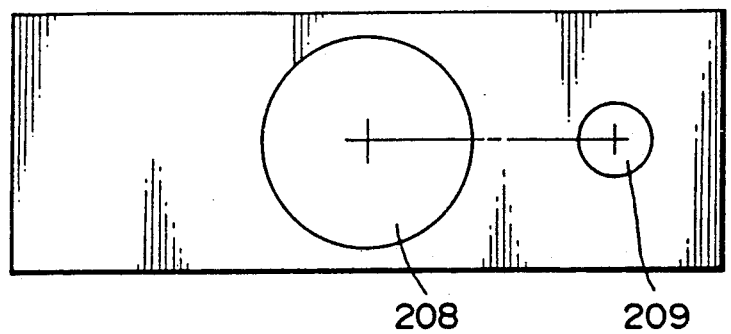
FIGS. 21 through 23 are arrangement views showing the view finder optical system in various positional relations to the photographic optical system of the third embodiment of the invention.
Figure 22:
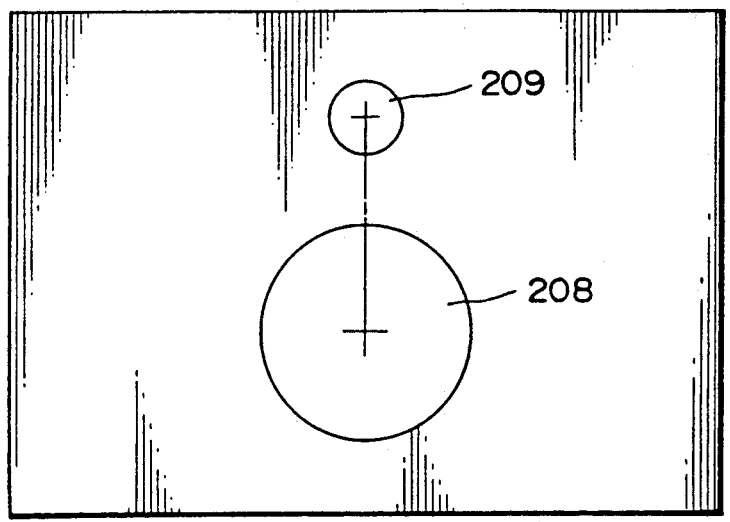
Figure 23:
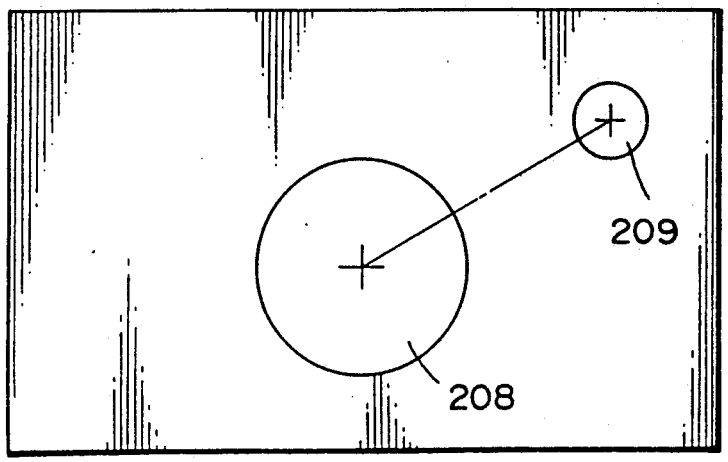

As to the positional relationship between the view finder optical system 220 and photographing optical system 208, there are cited, for instance, the cases where the view finder optical system 209 is located beside the photographing optical system 208 as shown in FIG. 21, over the latter as shown in FIG. 22, or diagonally above the latter as shown in FIG. 23, and the parallax and/or the gap in diopters possibly resulting in any of these arrangements can be compensated by proper adjustment of the positions of the individual reflective planes in any of the modes described above or proper combination thereof, as seen from the specific description below.

First to be described is the case where the view finder optical system 209 is located beside the photographing optical system 208 as shown in FIG. 21. At the time of macro-photographing parallax occurs in the direction connecting the optical axis centers of both optical systems (indicated by the alternate short and long dash line), hence in this case it occurs in the lateral direction. As seen from FIG. 18, therefore, this parallax can be compensated by simultaneously moving the second reflective plane 202 and the third reflective plane 203 sideways by equivalent of half the gap between the center of the taking scope and the center of the field of vision. Also, since the gap in diopters occurring and increasing as the object comes nearer can be compensated by increasing the length of the optical path from the objective lens 205 to the image-forming plane 221, compensation thereof is possible by lowering the second reflective plane 202 and the third reflective plane 203 by equivalent of half the aforementioned gap. Thus, the parallax and the gap in diopters occurring in this arrangement can be compensated by shifting the second reflective plane 202 and the third reflective plane 203 diagonally downward simultaneously.

Then, when the view finder optical system 209 is located over the photographing optical system 208 as shown in FIG. 22, parallax occurs in the vertical direction. Hence, simultaneous compensation of this parallax and the gap in diopters is feasible by, for example, lowering the first reflective plane 201 for compensation of the parallax only and at the same time lowering the second and third reflective planes 202 and 203 for compensation of the gap in diopters. Although it is also possible to compensate the gap in diopters by shifting the fourth reflective plane 204 as shown in FIG. 4, the parallax, too, is then compensated, hence its over- or under-compensation can also be corrected by shifting the first reflective plane. Conversely, it is also possible to compensate the parallax by adjusting the position of the fourth reflective plane 204 with simultaneous correction of the over- or under-compensation of the compensated gap in diopters through vertical adjustment of the positions of the second reflective plane 202 and the third reflective plane 203.

When the view finder optical system 209 is disposed diagonally above the photographing optical system 208 as shown in FIG. 23, the parallax, too, occurs along the diagonal direction. In this case the resulting parallax can be compensated by simultaneous adjustment of the position of the image vertically as well as laterally, hence vertical compensation through adjustment of the vertical position of the first reflective plane 201 or the fourth reflective plane 204 may be combined with the lateral compensation through lateral adjustment of the position of the second and third reflective planes 202 and 203. The compensation of the gap in diopters may then be done by lowering the second and third reflective planes 202 and 203.

Figure 24:
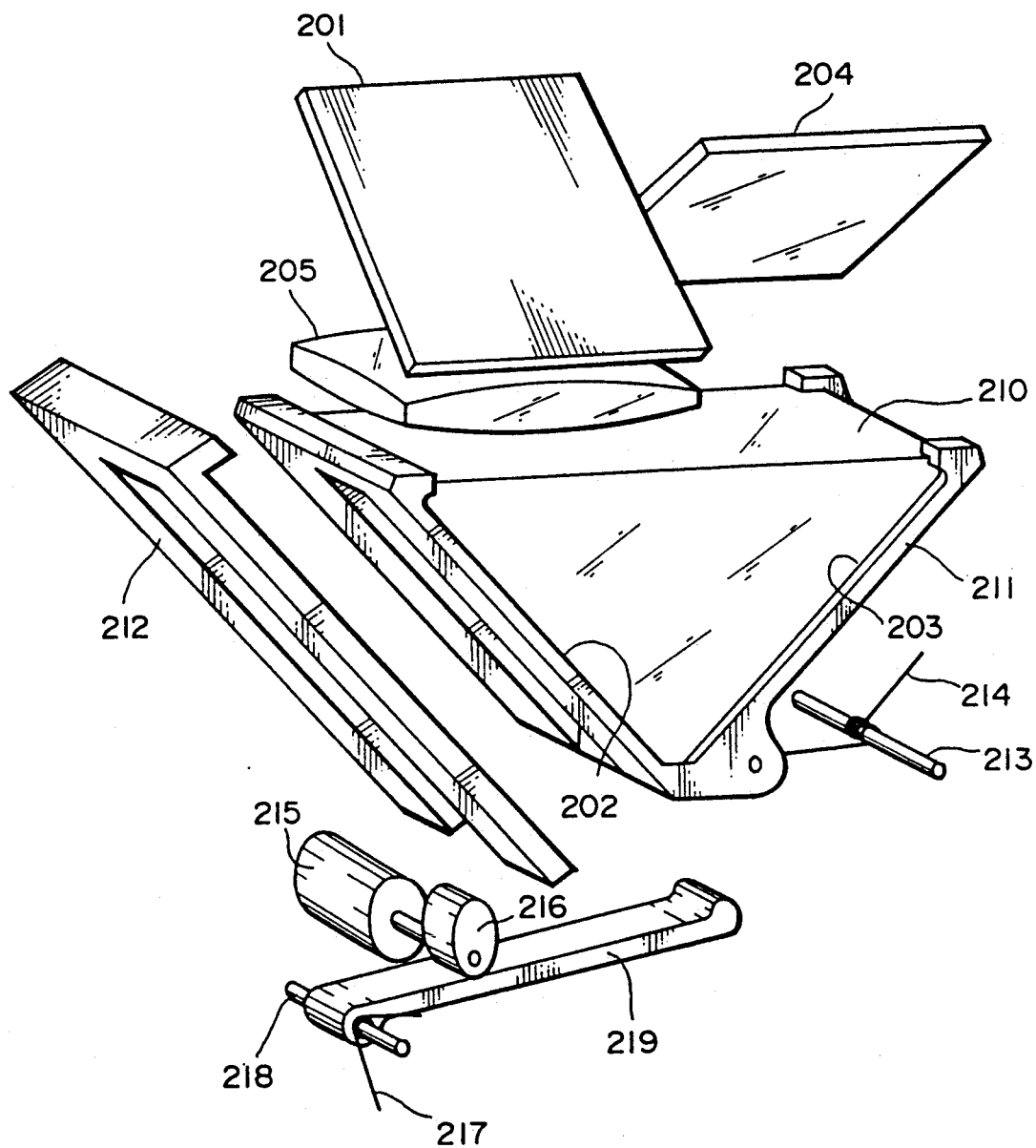
FIG. 24 is an exploded perspective view showing the position-adjusting mechanism of the reflective plane according to the third embodiment of the invention.

Now, referring to FIG. 24, an example of the position adjusting mechanism for adjusting the positions of the individual reflective planes 201, 202, 203 and 204. FIG. 24 is an exploded perspective view of the position adjusting mechanism. As seen from the figure, the first reflective plane 201 and the fourth reflective plane 204 are the specular surfaces of each one mirror respectively, while the second reflective plane 202 and the third reflective plane 203 are two sides of a prism 210. This prism 210 is retained by the retaining frame 211 and this retaining frame 211 is combined with a guide member 212 fixedly secured to the camera body to be slidable guided thereby and also urged downward by a first spring 214 set on a first pin 213 and also fixedly secured to the camera body. Meanwhile, when the normal photographing position is selected for the photographing optical system, this retaining frame 211 is pushed upward by a lever 219 which is urged by a second spring 217 from under with a second pin 218 as fulcrum, and the reflective planes 202 and 203 are thereby positioned where corresponding to the selected photographing position. Since the lever 219 has its angle varied with rotation of an eccentric cam 216 connected with a motor 215, the prism 210 moves diagonally downward along the guide member 212 as the tip of the lever is moved downward by rotation of the motor 215. Hence, in this composition, the parallax and the gap in diopter caused when macro-photographing is done by a camera having its view finder optical system 209 disposed aside the photographing optical system 208 can be simultaneously compensated by the action described above. Depending on the arrangement of both optical systems 208 and 209, there are cases where positional adjustment of the first reflective plane 201 and the fourth reflective plane 204 becomes necessary but even in such cases the positional adjustment of these reflective planes can be done easily through utilization of a similar mechanism.

Thus, the composition described above enables simultaneous compensation of parallax and gap in diopters by positional adjustment of the respective reflective planes. Also, since such compensation is feasible through combination of the positional adjustment of the respective reflective planes, the extent of shifting required of each reflective plane is small compared with the case where compensation is done by, for instance, longitudinal displacement of the objective lens. Hence, regardless of the photographing position of the photographing optical system, it is possible to miniaturize a view finder capable of seeing its field of view in a proper scope and also clearly.

Although the present invention has been fully described by way of example with reference to the accompanying drawings, it is to be noted here that various changes and modifications will be apparent to those skilled in the art. Therefore, unless otherwise such changes and modifications depart from the scope of the present invention as defined by the appended claims, they should be construed as included therein.

What is claimed is:

1. A viewfinder optical system, separate from a photographing optical system, for picture taking, comprising:
- an objective lens;
- an eyepiece;
- a compensation lens, capable of being inserted into and being retracted from an optical path of the viewfinder optical system, for simultaneously compensating, at its inserting position for any variance in parallax error between the viewfinder optical system and the photographing optical system and any change in diopter, both of which cause problems at closer object distances, and
- means for inserting the compensation lens into the optical path of the viewfinder optical system at object distances closer than a predetermined distance.

2. The viewfinder optical system of claim 1, wherein the inserting means inserts the compensation lens in front of the objective lens.

3. The viewfinder optical system of claim 1, wherein the inserting means inserts the compensation lens behind the objective lens.

4. The viewfinder optical system of claim 1, wherein the compensation lens is a single wedge-formed lens having at least one spherical surface.

5. The viewfinder optical system of claim 4, wherein the compensation lens has a flat surface inclined to a plane perpendicular to an optical axis of the objective lens and a spherical surface with its center of curvature on the optical axis of the objective lens at the inserting position.

6. The viewfinder optical system of claim 4, wherein the compensation lens has a flat surface perpendicular to an optical axis of the objective lens and a spherical surface with its optical axis eccentric against the optical axis of the objective lens at the inserting position.

7. The viewfinder optical system of claim 4, wherein the compensation lens has a spherical surface with its optical axis eccentric against the optical axis of an objective lens and another spherical surface with its center of curvature on the optical axis of the objective lens at the inserting position.

8. The view finder optical system of claim 1, wherein the viewfinder optical system is a real image type in which the objective lens forms a real image on a predetermined image forming plane, and the eyepiece enlarges the image for observation.

9. The viewfinder optical system of claim 1, wherein the photographing optical system has a normal photographing mode and a macro photographing mode, and the inserting means inserts the compensation lens at the macro photographing mode.

10. A view finder optical system, separate from a photographing optical system, for picture taking, comprising:
- a first objective lens capable of being inserted into and being retracted from an optical path of the view finder optical system;
- an eyepiece;
- a second objective lens, capable of being inserted into and being retracted from the optical path of the viewfinder optical system, for simultaneously compensating, at its inserting position, for any variance in parallax error between the viewfinder optical system and the photographing optical system and any change in diopter, both of which cause problems at closer object distances, and
- drive means for retracting the first objective lens from the optical path of the viewfinder optical system and inserting the second objective lens into it at object distances closer than a predetermined distance, and for retracting the second objective lens and inserting the first lens at object distances longer than the predetermined distance.

11. The viewfinder optical system of claim 10, wherein a focal length of the first objective lens is longer than that of the second objective lens.

12. The viewfinder optical system of claim 11, wherein an optical axis of the second objective lens is eccentric against that of the viewfinder optical system.

13. The viewfinder optical system of claim 10, wherein the viewfinder optical system is a real image type in which the objective lens forms a real image on a predetermined image forming plane, and the eyepiece enlarges the image for observation.

14. The viewfinder optical system of claim 10, wherein the photographing optical system has a normal photographing mode and a macro photographing mode, and a drive means retracting the first objective lens and inserting the second objective lens at the macro photographing mode.

15. A viewfinder optical system, separate from a photographing optical system, for picture taking, comprising:
- an objective lens;
- an eyepiece, and
- means for simultaneously compensating for any variance in parallax error between the viewfinder optical system and the photographing optical system and any change in diopter at object distances closer than a predetermined distance by shifting the objective lens forward and for making an optical axis of the objective lens eccentric against that of the viewfinder optical system.

16. The viewfinder optical system of claim 15, wherein the compensating means makes the optical axis of the objective lens eccentric against that of the viewfinder optical system so that the optical axis of the objective lens intersects that of the viewfinder optical system at a forward position.

17. The viewfinder optical system of claim 15, wherein the viewfinder optical system is a real image type in which the objective lens forms a real image on a predetermined image forming plane, and the eyepiece enlarges the image for observation.

18. The viewfinder optical system of claim 15, wherein the photographing optical system has a normal photographing mode and a macro photographing mode, and the compensating means performs its operation at the macro photographing mode.

19. Area image type viewfinder optical system, separate from a photographing optical system, for picture taking, comprising:
- an objective lens for forming an inverted image;
- an image erecting optical system, having at least one reflection surface, for erecting the inverted image;
- an eyepiece for enlarging the erected image, and
- means for simultaneously compensating for any variance in parallax error between the viewfinder optical system and the photographing optical system and any change in diopter at object distances closer than a predetermined distance by shifting the reflection surface.

20. The viewfinder optical system of claim 19, wherein the photographing optical system has a normal photographing mode and a macro photographing mode, and the compensating means performs its operation at the macro photographing mode.

21. A viewfinder optical system, separate from a photographing optical system, for picture taking, comprising:
   an objective lens;
   an eyepiece, and
   means for simultaneously compensating for any variance in parallax error between the viewfinder optical system and the photographing optical system and any change in diopter at object distances closer than a predetermined distance.

22. The viewfinder optical system of claim 21, wherein the photographing optical system has a normal photographing mode and a macro photographing mode, and the compensating means performs its operation at the macro photographing mode.

* * * * *

UNITED STATES PATENT OFFICE
CERTIFICATE OF CORRECTION

Patent No. 5,117,247      Dated May 26, 1992

Inventor(s)    Etsuku Nakai et al.

It is certified that error appears in the above-identified patent and that said Letters Patent is hereby corrected as shown below:

Title page, item (54):

In the title: delete "MACROPHOTOGRAPHIC OR PARALLOX" and insert --MACRO PHOTOGRAPHING FOR PARALLAX--.

Signed and Sealed this

Sixth Day of July, 1993

Attest:

MICHAEL K. KIRK

*Attesting Officer*      *Acting Commissioner of Patents and Trademarks*